United States Patent [19]

Tamura

[11] Patent Number: 4,638,664
[45] Date of Patent: Jan. 27, 1987

[54] QUARTZ BAROMETER

[75] Inventor: Fujio Tamura, Tokyo, Japan

[73] Assignee: Seiko Instruments & Electronics Ltd., Tokyo, Japan

[21] Appl. No.: 783,249

[22] Filed: Oct. 2, 1985

[30] Foreign Application Priority Data

Oct. 3, 1984 [JP] Japan ................................ 59-207576

[51] Int. Cl.⁴ ............................................ G01L 11/00
[52] U.S. Cl. ...................................... 73/384; 73/702; 73/708; 73/754; 374/117; 374/143
[58] Field of Search ................ 73/384, 386, 387, 754, 73/708, 702, 703; 374/117, 143; 310/315

[56] References Cited

U.S. PATENT DOCUMENTS 4,015,208  3/1977  Hammer et al. ..................... 374/117
4,558,248  12/1985  Valentin ............................. 374/117

Primary Examiner—Donald O. Woodiel
Attorney, Agent, or Firm—Robert E. Burns; Emmanuel J. Lobato; Bruce L. Adams

[57] ABSTRACT

In a quartz barometer untilizing the temperature dependence of the resistance of a quartz oscillator at resonance, the present invention is directed to provide a circuit which compensates for the temperature change of the resistance at resonance by connecting a temperature-dependent resistor in series with a quartz oscillator thereby enabling said quartz barometer to measure gas pressure much more accurately.

1 Claim, 6 Drawing Figures

QUARTZ BAROMETER

BACKGROUND OF THE INVENTION

This invention relates to a barometer for measuring gas pressure around a quartz oscillator using the quartz oscillator.

There is an urgent need in industrial applications to measure continuously gas pressure ranging from ambient pressure to $10^{-3}$ Torr with a single sensor.

A quartz barometer which utilizes the phenomenon that the frequency at resonance of a quartz oscillator increases with a decreasing gas pressure surrounding the oscillator satisfies to some extent the industrial requirement described above. However, this barometer involves a critical problem in that the lower limit of measurement is about 10 Torr. Though a heat conduction vacuum gauge such as the Pirani gauge has a lower limit value of measurement of about $10^{-4}$ to $10^{-3}$ Torr, it is not free from the same problem as that of the quartz type barometer because its upper limit of measurement is about 10 Torr.

It has been shown recently that the resonance resistance of a quartz oscillator depends upon ambient gas pressure over an extremely wide range, and that a barometer which can continuously measure pressure ranging from ambient atmospheric pressure to $10^{-3}$ Torr can be realized by utilizing this property. This is reported, for example, in "Development of Ultra-Miniature Vacuum Sensor Using Quartz Oscillator" in the magazine "Instrumentation", 1984, Vol. 27, No. 7.

However, in a quartz barometer having the prior art construction which utilizes the temperature depedence of the resistance of a quartz oscillator at resonance described above, a problem has been left unsolved in that precision measurement can not be readily effected because the resistance of the quartz oscillator at resonance varies markedly with temperature, particularly in the low pressure range of roughly $10^{-3}$ to $10^{-2}$ Torr.

SUMMARY OF THE INVENTION

To eliminate this problem, in a quartz barometer utilizing the temperature dependence of the resistance of a quartz oscillator at resonance, the present invention is directed to provide means which compensate for the temperature change of the resistance at resonance by connecting a temperature-dependent resistor in series with a quartz oscillator thereby enabling said quartz barometer to measure gas pressure much more accurately.

DETAILED DESCRIPTION OF PREFERRED EMBODIMENTS

Hereinafter, the present invention will be described with reference to the accompanying drawings.

Figure 1:
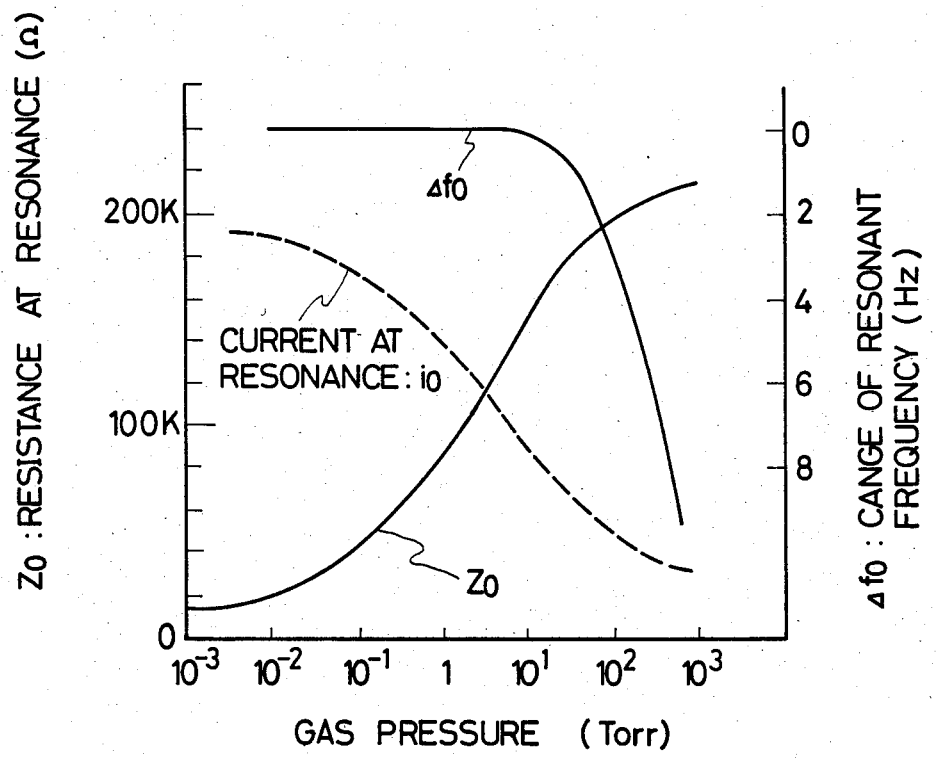
FIG. 1 is a diagram showing the relation between the characteristic values (resistance at resonance, current at resonance, resonant frequency) of a quartz oscillator and ambient gas pressure.

FIG. 1 is a diagram showing the relation between gas pressure and the characteristic values (resistance at resonance, current at resonance and resonant frequency) of a quartz oscillator. The resonant frequency starts changing when pressure exceeds 10 Torr, but the sensitivity to pressure is virtually nil below 10 Torr. However, the resistance of a quartz oscillator at resonance is sensitive to pressure ranging from ambient atmospheric pressure to $10^{-3}$ Torr. When this quartz oscillator is driven at a constant voltage, a resonance current-v-gas pressure curve can be obtained as represented by symbol $i_o$ in the diagram. It is sensitive to pressure ranging from ambient atmospheric pressure to $10^{-3}$ Torr in the same say as the resistance at resonance described above. Therefore, it is easier to measure the current at resonance or the voltage at resonance than to measure the resistance at resonance.

Figure 2:
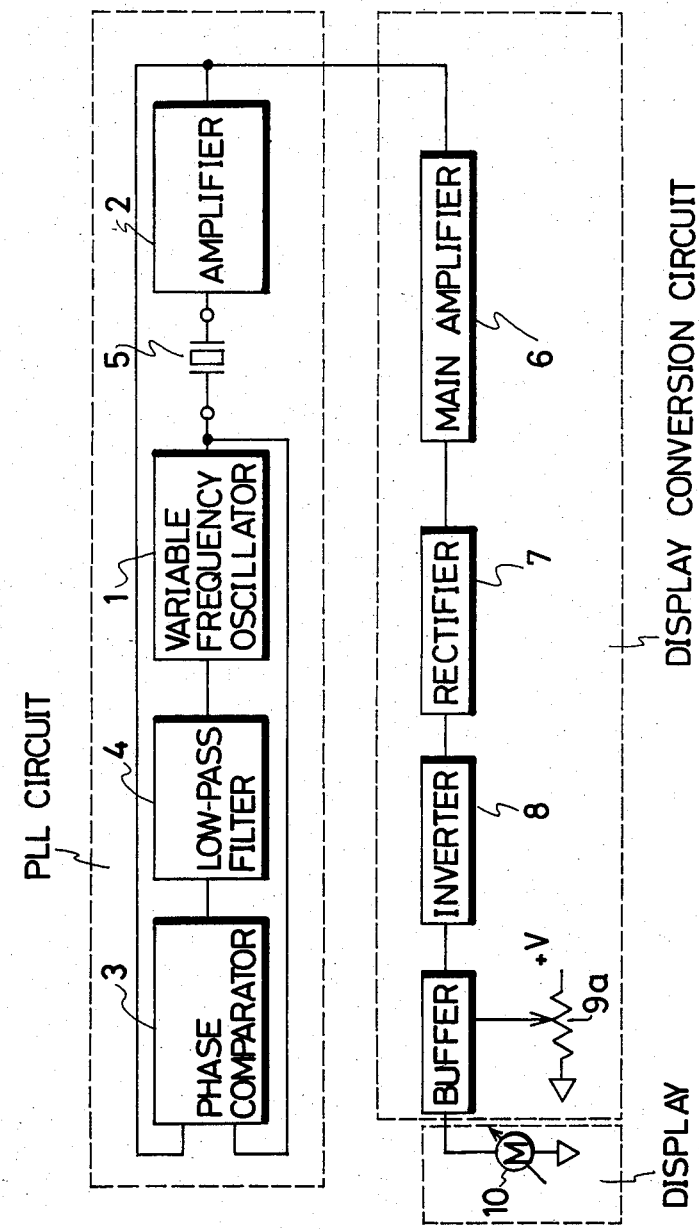
FIG. 2 is a block diagram of a quartz barometer electronic circuit in accordance with the present invention.

FIG. 2 is a block diagram of a quartz barometer electronic circuit to which the present invention is directed. Its principal components are a PLL circuit, a display conversion circuit and a display. The PLL circuit consists of a variable frequency oscillator 1 which is controlled by a voltage or a current, an amplifier 2 which amplifies the current of a quartz oscillator 5 at resonance as a voltage, a phase comparator 3 which compares the phase of the output signal of the amplifier 2 with that of the output signal of the variable frequency oscillator 1 and produces a signal proportional to the phase difference, and a low-pass filter 4 which converts the pulse-like output signal of the phase comparator 3 to a d.c. voltage. The output voltage of the low-pass filter 4 controls the oscillation frequency of the variable frequency oscillator 1. The pressure-sensitive quartz oscillator 5 is connected to the output terminal of the variable frequency oscillator 1 and the input terminal of the amplifier 2.

The principle of operation of the PLL circuit is well known already, it is not described herein. The output signal of the variable frequency oscillator 1 is always controlled such that the phase difference between the output signal of the variable frequency oscillator 1, that is, the driving voltage of the quartz oscillator 5, and the output signal of the amplifier 2, that is, the current flowing through the quartz oscillator 5, is zero. Therefore the quartz oscillator 5 is always driven at its resonance frequency. This is a significant factor in practical application of a quartz barometer since the resonant frequency of the quartz oscillator varies with pressure as shown in FIG. 1.

Next, the display conversion circuit portion consists of a main amplifier 6 which further amplifies the signal from the amplifier 2, a rectifier 7 which changes the output signal of the main amplifier 6 to d.c. an inverter 8 which inverts the polarity of the output viltage of the rectifier 7, and a buffer 9 which biases the output voltage of the inverter 8. The bias level can be controlled by a variable resistor 9a. The display may be either digital or analog. In this embodiment, it consists of a meter 10; pressure is read from the deflection angle of said meter.

Figure 3:
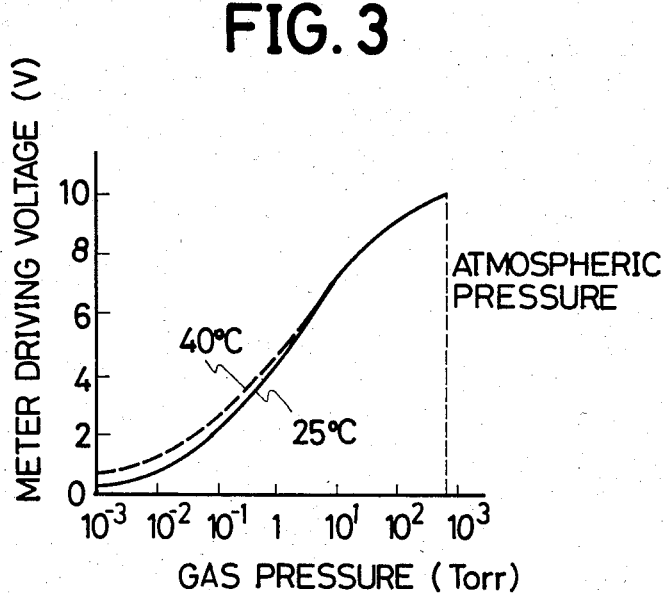
FIG. 3 is a diagram showing the relation between the meter driving voltage and ambient pressure.

The pressure characteristics of the resonant current of the quartz oscillator are such that said current increases as ambient pressure decreases, as shown in FIG. 1. Therefore, if the current at resonance is amplified as a voltage and is changed to d.c. to drive the meter, the deflection angle of the meter will increase with decreasing pressure; consequently, the display will be the opposite of the detected pressure. This is obviously undesirable from the common sense point of view; therefore, the inverter 8 inverts the polarity of the d.c. voltage, and the buffer 9 then applies the bias voltage so that the meter dirving voltage shown in FIG. 3 can be obtained. In the embodiment shown in FIG. 3, the bias quantity is adjusted so that the meter driving voltage is 10 V at ambient atmospheric pressure. In this manner, a conventional pressure display can be effected in which the meter indicator angle of deflection increases as ambient atmospheric pressure increases and decreases as ambient atmospheric pressure decreses.

Figure 4:
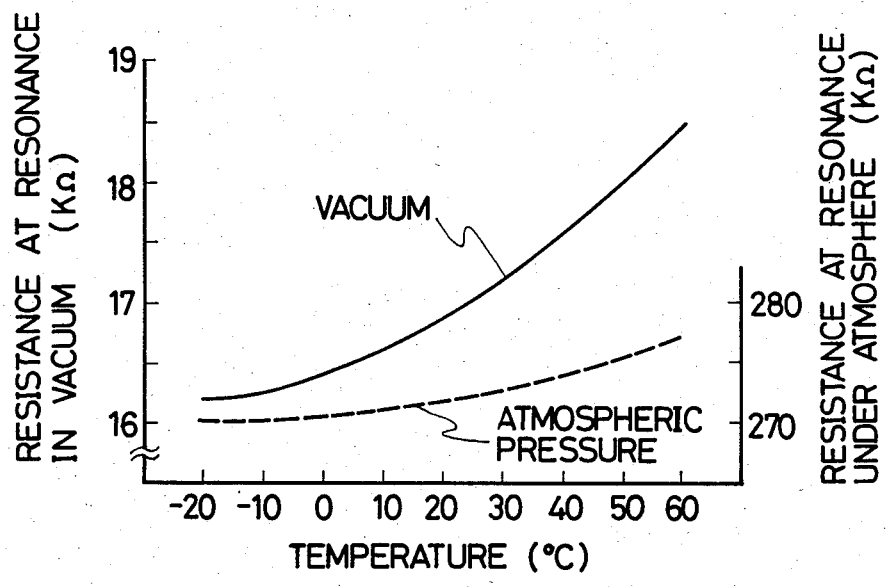
FIG. 4 is a diagram showing the temperature characteristics of the resistance of the quartz oscillator at resonance.

FIG. 4 shows the temperature characteristics of the resistance of the quartz oscillator at resonance. The degree of change of the resistance at resonance due to temperature is great in vacuum, and the resistance at resonance increases with as temperature increases. Since most of the resistance at resonance in the ambient atmosphere is frictional resistance, the resistance at resonance does not vary greatly with temperature. As a result, the prior art technique involves the problem that the effect of temperature increases markedly as gas pressure decreases, thereby introducing an error into the measured value.

The present invention provides means for minimizing the error just described.

Figure 5:
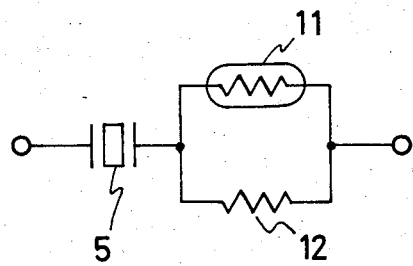
FIG. 5 is a circuit diagram showing one embodiment of the present invention.
Figure 6:
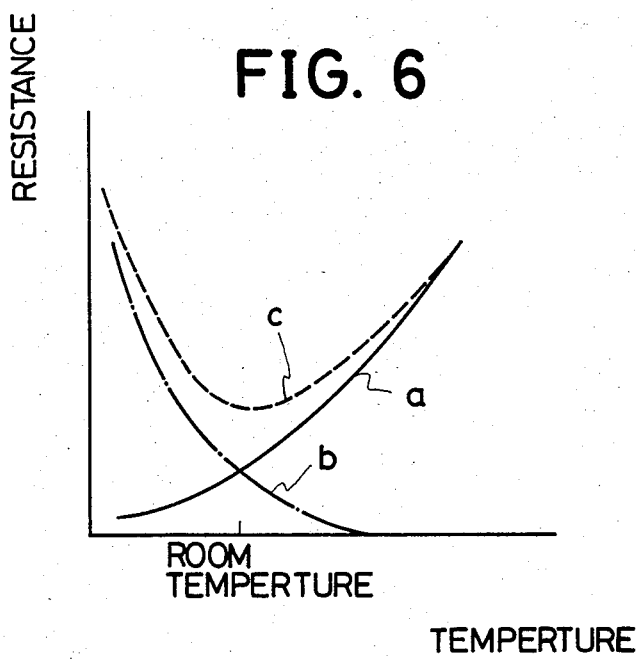
FIG. 6 is a diagram showing the temperature characterstics of the embodiment of the present invention.

FIG. 5 shows one embodiment of the present invention. Component 5 is a quartz osoillator, 11 is a thermistor and 12 is a resistor. In FIG. 6, a is the curve of the temperature characteristics of the resistance at resonance of the quartz oscillator at resonance, b is the curve of the temperature characteristics of the combined resistance of the thermistor and the resistor, and c is the curve of the temperature characteristics of the combined resistance of the quartz oscillator, the thermistor and the resistor. The resistance of the quartz oscillator at resonance has a positive temperature coefficient, whereas the resistance of the thermistor has a negative temperature coefficient. If they are connected in series, therefore, the combined resistance value becomes a curve which has a valley with respect to temperature. The resistor described above is a variable resistor so that the temperature range of the valley is that of room temperature (20°-30° C.).

The resistance of the thermistor is not affected by the gas pressure around it; hence, it can compensate for temperature without regard to pressure. In the prior art technique in which the thermistor does not compensate for temperature, the measured value of $1 \times 10^{-2}$ Torr at 25° C. varies to a maximum of $4 \times 10^{-2}$ Torr if the ambient temperature varies from 10° C. to 40° C. If the thermistor compensates for temperature, the measured value of $1 \times 10^{-2}$ Torr at 25° C. will fall within the range of a maximum of $2 \times 10^{-2}$ Torr. Thus, the measurement error due to temperature can be reduced by half. The practical temperature range in the environment of measurement is roughly 25°±5° C. Since the embodiment of the present invention can easily set the minimal point of the resistance value relative to the temperature to 25° C., measurement error due to varying temperature can be drastically reduced in practice.

As described above, the present invention can minimize the adverse effect of varying temperature upon the resistance of the quartz oscillator at resonance by extremely simple means, and can improve accuracy, particularly, in the low pressure range. Since the barometer of the present invention is simply constructed, any increase in the production costs will be minimal.

Though the embodiment described above uses the thermistor as a device to compensate for temperature characteristics of resistance of a quartz oscillator at resonance, devices other than the thermistor can be of course employed if they have a temperature coefficient opposite to that of the resonance of the quartz oscillator at resistance.

What is claimed is:

1. In a quartz barometer of the type which includes at least:

a phase locked loop circuit (PLL circuit) component consisting of a variable frequency oscillator, a phase comparator, a low-pass filter and an amplifier;

a quartz oscillator connected to said variable frequency oscillator;

a display conversion circuit portion connected to said PLL circuit portion; and a display portion connected to said display conversion circuit portion;

and which measures the pressure of an environmental gas of said quartz oscillator from a resistance value at resonance or current value at resonance or voltage value at resonance of said quartz oscillator, the improvement wherein a temperature-dependent resistor having temperature characteristics opposite those of the resistance at resonance of said quartz oscillator and the resistance value thereof not dependent upon the ambient pressure of the gas is connected in series with said quartz oscillator.

* * * * *